United States Patent
Rajagopal et al.

(10) Patent No.: US 11,516,165 B2
(45) Date of Patent: Nov. 29, 2022

(54) REVOKING MESSAGES WITHIN A MESSAGE CHAIN

(71) Applicant: Microsoft Technology Licensing, LLC, Redmond, WA (US)

(72) Inventors: Sukanya Rajagopal, Hyderabad (IN); Vikhyat Khosla, Hyderabad (IN); Aayushi Joshi, Hyderabad (IN); Nikhil Maryala, Hyderabad (IN); Manohar Kumar, Hyderabad (IN); Rakesh Midha, Hyderabad (IN); Arun Rajappa, Hyderabad (IN); Deepak Kumar Pratinidhi, Hyderabad (IN); Rajiv Kumar, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 27 days.

(21) Appl. No.: 16/380,891

(22) Filed: Apr. 10, 2019

(65) Prior Publication Data

US 2020/0328998 A1 Oct. 15, 2020

(51) Int. Cl.
*G06F 15/16* (2006.01)
*H04L 51/212* (2022.01)
(Continued)

(52) U.S. Cl.
CPC ............ *H04L 51/212* (2022.05); *G06F 16/22* (2019.01); *H04L 51/214* (2022.05); *H04L 51/234* (2022.05)

(58) Field of Classification Search
CPC ......... H04L 51/12; H04L 51/34; H04L 51/14; G06F 16/22; G06Q 10/107
See application file for complete search history.

(56) References Cited

U.S. PATENT DOCUMENTS 8,086,635 B1 * 12/2011 Rinker .................. G06F 21/604
 707/783
8,457,668 B2 6/2013 Speede
(Continued)

FOREIGN PATENT DOCUMENTS

EP 0984593 A1 3/2000
EP 2996361 A1 3/2016
WO 2010040308 A1 4/2010

OTHER PUBLICATIONS

Griffin, Andrew, "Whatsapp Update to Include Small 'Forwarded' Message in Effort to Fight Hoaxes", Retrieved from: https://www.independent.co.uk/life-style/gadgets-and-tech/news/whatsapp-update-india-forwarded-message-hoax-fake-news-false-latest-a8442081.html , Jul. 11, 2018, 6 Pages.
(Continued)

*Primary Examiner* — John B Walsh
(74) *Attorney, Agent, or Firm* — Schwegman Lundberg & Woessner, P.A.

(57) ABSTRACT

Methods and systems for revoking electronic messages. One method includes storing, for each of a plurality of forwarded messages, a record in a data store, each record including a link to an original message for the forwarded message, and receiving a request to revoke a forwarded message. In response to receiving the request, the method includes identifying an original message the forwarded message via a record stored in the data store and notifying, with an electronic processor, a user associated with the original message of the request to revoke the forwarded message. In response to receiving an instruction revoking the original source message from the user, the method includes identifying each forward of the original message via records stored in the data store and revoking the original message (Continued)

and each message associated with each record stored in the data store including a link to the original message.

18 Claims, 9 Drawing Sheets

(51) Int. Cl.
*G06F 16/22* (2019.01)
*H04L 51/214* (2022.01)
*H04L 51/234* (2022.01)

(56) References Cited

U.S. PATENT DOCUMENTS

| | | |
|---|---|---|
| 8,955,106 B2 | 2/2015 | Rihn et al. |
| 9,961,090 B2 | 5/2018 | D'Aveta et al. |
| 2005/0124360 A1 | 6/2005 | Choi |
| 2011/0213845 A1 | 9/2011 | Logan et al. |
| 2012/0173633 A1* | 7/2012 | Balabhadrapatruni ............ G06Q 10/107 709/206 |
| 2013/0086185 A1* | 4/2013 | Desmarais ............ H04L 51/10 709/206 |
| 2015/0319141 A1 | 11/2015 | Jang et al. |

OTHER PUBLICATIONS

Phillips, Gavin, "How to Trace Emails Back to Their Source IP Address", Retrieved from: https://www.makeuseof.com/tag/how-to-trace-your-emails-back-to-the-source/, Retrieved Date: Jan. 11, 2019, 24 Pages.

"International Search Report and Written Opinion Issued in PCT Application No. PCT/US20/024118", dated Jun. 19, 2020, 13 Pages.

* cited by examiner

REVOKING MESSAGES WITHIN A MESSAGE CHAIN

FIELD

Embodiments described herein relate to revoking electronic messages and, in particular, relate to revoking messages in a message chain where an original message is forwarded to one or more additional recipients while retaining control for such message revoking with the author of the original message (or an administrator associated with a group containing the author of the message).

SUMMARY

The ability to forward electronic messages is available in most electronic messaging systems, such as chat applications, email applications, instant messaging applications, and the like. Accordingly, with this functionality, a message can quickly propagate ("go viral") between multiple users, groups of users, and conversations, even without the message author's knowledge. Sometimes, the content of the message may be undesirable or inappropriate. For example, the content of the message may be fake, spam, malicious, or vulgar. Thus, there is a need for moderation and revoking of these messages.

In some electronic messaging systems, a message author (or an administrator associated with the message author) can delete or revoke a message from the original group the author sent the message to. However, in these systems, the message author cannot track whether any members of the original group forwarded the message to other users or groups, which limits the ability of a sent message to be fully revoked. Furthermore, in some embodiments, the message author is required to revoke any messages from the original group within a predetermined time period, which also limits the ability to revoke messages.

Thus, embodiments described herein provide, among other things, systems and methods for revoking electronic messages. In particular, the methods and systems described herein moderate messages that have been forwarded to users or groups of users that the message author may have no relationship with or knowledge that the message was forwarded to such users or groups or users. Accordingly, the message author (or an administrator associated with a message author) can control and revoke messages, such as messages containing malicious content, spam, inappropriate words, phrases, or images, and the like. This ability to revoke may also be useful to control the distribution of sensitive or restricted content, such as in a professional setting.

For example, one embodiment provides a system for revoking an electronic message. The system includes an electronic processor configured to store, for each of a plurality of forwarded messages sent via an electronic messaging application, a record in a data store, each record including a link to an original message for the forwarded message and receive a request to revoke one of the plurality of forwarded messages. In response to receiving the request, the electronic processor is configured to identify an original message for the one of the plurality of forwarded messages via a record stored in the data store and notify a user associated with the original message of the request to revoke the one of the plurality of forwarded messages. In response to receiving an instruction revoke the original source message from the user, the electronic processor is configured to identify each forward of the original message via records stored in the data store including a link to the original message and revoke the original message and each message associated with each record stored in the data store including a link to the original message to revoke the original message and each forward of the original message.

Another embodiment provides a method for revoking an electronic message. The method includes storing, for each of a plurality of forwarded messages sent via an electronic messaging application, a record in a data store, each record including a link to an original message for the forwarded message and receiving a request to revoke one of the plurality of forwarded messages. In response to receiving the request, the method includes identifying an original message for the one of the plurality of forwarded messages via a record stored in the data store and notifying a user associated with the original message of the request to revoke the one of the plurality of forwarded messages. In response to receiving an instruction revoke the original source message from the user, the method includes identifying, with an electronic processor, each forward of the original message via records stored in the data store including a link to the original message and revoking the original message and each message associated with each record stored in the data store including a link to the original message to revoke the original message and each forward of the original message.

Yet another embodiment provides a non-transitory computer-readable medium including instructions executable by an electronic processor to perform a set of functions. The set of functions are configured to store, for each of a plurality of forwarded messages sent via an electronic messaging application, a record in a data store, each record including a link to an original message for the forwarded message and receive a request to revoke one of the plurality of forwarded messages. In response to receiving the request, the set of functions are configured to identify an original message for the one of the plurality of forwarded messages via a record stored in the data store and notify a user associated with the original message of the request to revoke the one of the plurality of forwarded messages. In response to receiving an instruction to revoke the original source message from the user, the set of functions are configured to identify, with an electronic processor, each forward of the original message via records stored in the data store including a link to the original message, and revoke the original message and each message associated with each record stored in the data store including a link to the original message to revoke the original message and each forward of the original message.

Another embodiment provides a system for tracing forwards of an electronic message. The system includes an electronic processor configured to store, for each of a plurality of forwarded messages sent via an electronic messaging application, a record in a data store, each record including a link to an original message for the forwarded message and calculate a statistic for an electronic message based on records stored in the data store, wherein the statistic includes at least one selected from a group consisting of a number of forwards of the electronic message, a number of recipients of the electronic message including all forwards of the electronic message, and a number of requests to revoke the electronic message. The electronic processor is further configured to output the statistic for display to a user via at least one user interface.

A further embodiments provides a method of tracing forwards of an electronic message. The method includes storing, for each of a plurality of forwarded messages sent via an electronic messaging application, a record in a data store, each record including a link to an original message for the forwarded message and calculating, with an electronic processor, a statistic for an electronic message based on records stored in the data store, wherein the statistic includes at least one selected from a group consisting of a number of forwards of the electronic message, a number of recipients of the electronic message including all forwards of the electronic message, and a number of requests to revoke the electronic message. The method also includes outputting the statistic for display to user via at least one user interface.

Yet another embodiment provides a non-transitory computer-readable medium including instructions executable by an electronic processor to perform a set of functions. The set of functions are configured to store, for each of a plurality of forwarded messages sent via an electronic messaging application, a record in a data store, each record including a link to an original message for the forwarded message and calculate a statistic for an electronic message based on records stored in the data store, wherein the statistic includes at least one selected from a group consisting of a number of forwards of the electronic message, a number of recipients of the electronic message including all forwards of the electronic message, and a number of requests to revoke the electronic message. The set of functions are further configured to output the statistic for display to a user via at least one user interface.

DETAILED DESCRIPTION

Figure 1:
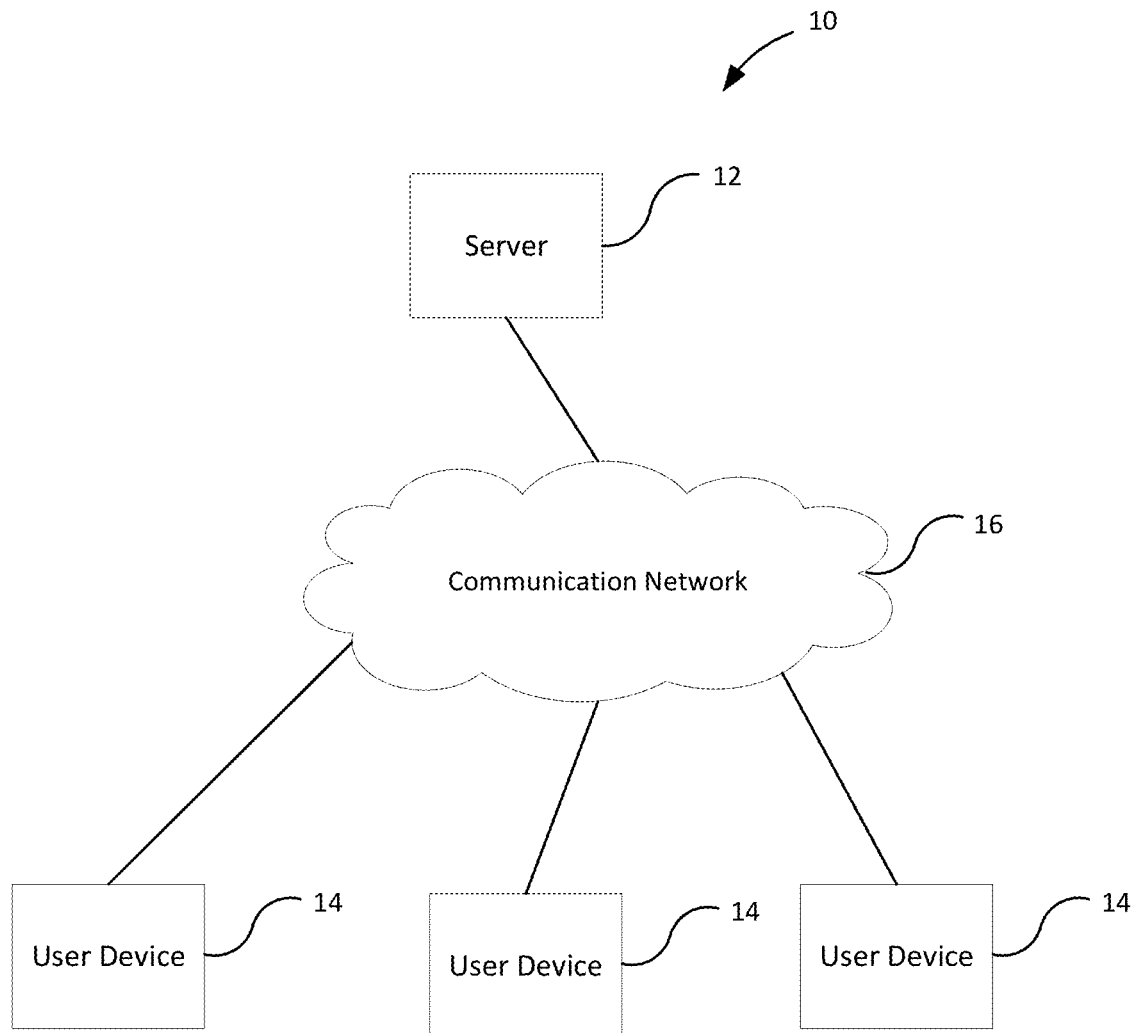
FIG. 1 schematically illustrates a system for revoking an electronic message according to one embodiment.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

As described above, moderating electronic messages is a difficult process when messages can be forwarded with little or no control by the message author. Accordingly, to address these and other technical problems associated with electronic messaging systems, systems and methods described herein revoke messages, and, in particular, as described in further detail below, revoke a message not only from the original group of users receiving the message from the message author but also from every user or group that received the message as a forward.

For example, FIG. 1 schematically illustrates a system 10 for revoking an electronic message. As illustrated in FIG. 1, the system 10 includes a server 12, a plurality of user devices 14 (also referred to individually as a user device 14), and a communication network 16. It should be understood that the system 10 is provided as an example and, in some embodiments, the system 10 includes additional components. For example, the system 10 may fewer or additional user devices 14, more than one server 12, more than one communication network 16, and the like.

The server 12 and the plurality of user devices 14 communicate over the communication network 16. Portions of the communication network 16 may be implemented using a wireless network, such as a wide area network (for example, the Internet), a local area network (for example, a Bluetooth™ network or Wi-Fi), or combinations or derivatives thereof. Alternatively or in addition, portions of the communication network 16 may be implemented using dedicated connections (such as wired or wireless connections). It should also be understood that, in some embodiments, the server 12 and the plurality of user devices 14 may communicate through one or more intermediary devices not shown in FIG. 1.

Figure 2:
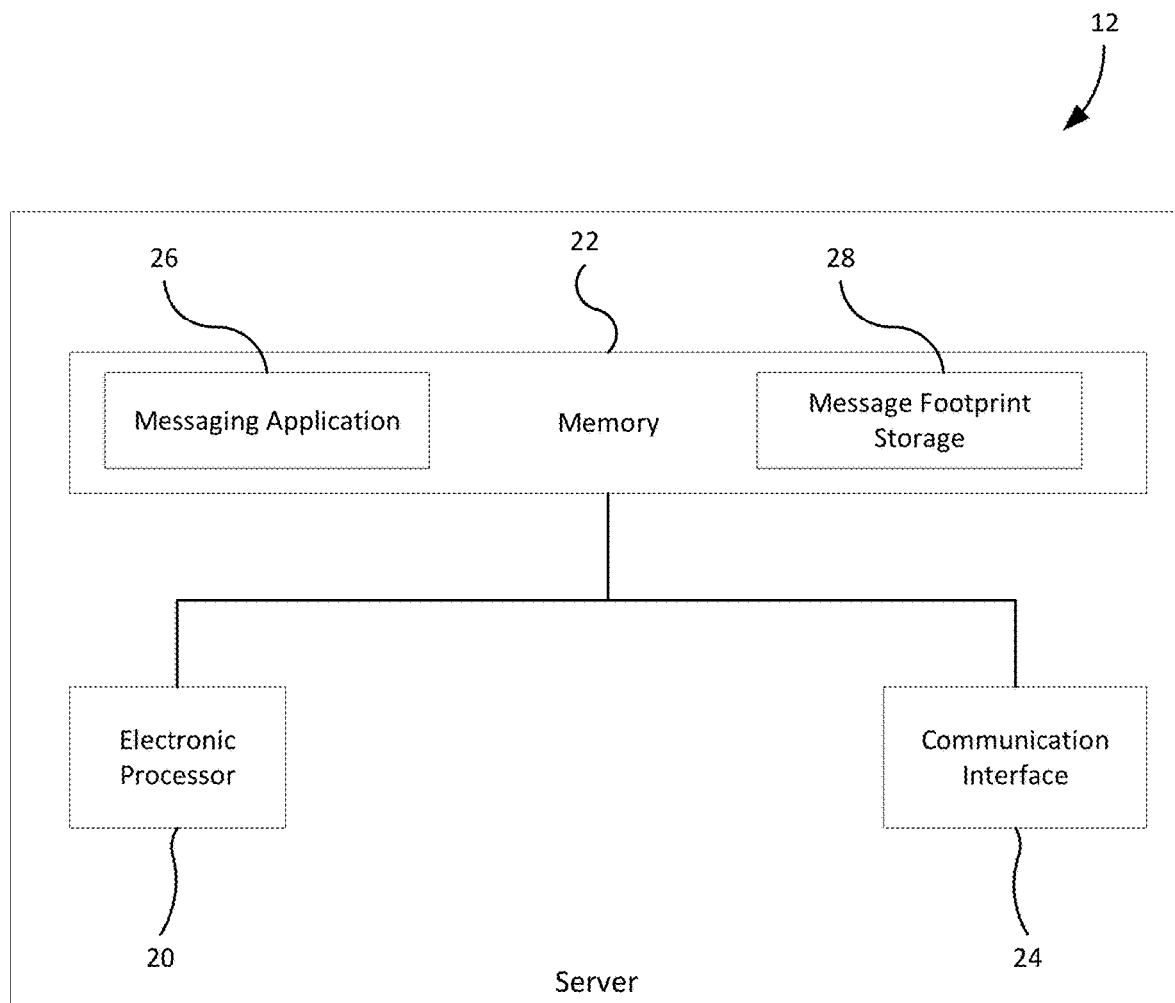
FIG. 2 illustrates a server included in the system of FIG. 1 according to one embodiment.

The server 12 is a computing device. As illustrated in FIG. 2, in some embodiments, the server 12 includes an electronic processor 20, a memory 22, and a communication interface 24. The electronic processor 20, the memory 22, and the communication interface 24 communicate over one or more communication lines or buses, wirelessly, or a combination thereof. In some embodiments, the server 12 includes additional components than those illustrated in FIG. 2 and the components included in the server 12 may arranged in various configurations.

The communication interface 24, may include a wireless transceiver, allows the server 12 to communicate with external devices, such as the plurality of user devices 14 over the communication network 16.

The memory 22 includes a non-transitory, computer-readable storage medium. The electronic processor 20 includes a microprocessor, application-specific integrated circuit (ASIC), or another suitable electronic device. The electronic processor 20 is configured to retrieve data from the memory 22 and execute, among other things, software (instructions) related to the processes and methods described herein. It should be understood that the server 12 may perform additional functionality than the functionality described herein. Also, as noted above, the functionality described herein as being performed by the server 12 may be performed by multiple servers in a distributed or cloud-based environment.

As illustrated in FIG. 2, the memory 22 stores a messaging application 26. The messaging application 26 contains data and instructions that, when executed by the electronic processor 20, are configured to allow the plurality of user devices 14 to send and receive electronic messages. The messaging application 26 may include a chat application, an email application, an instant messaging application, or the like. Electronic messages exchanged between the user devices 14 may be stored on the server 12 (for example, the memory 22) or separate from the server 12 (in a database accessible by the server 12). It should be understood that the functionality described herein as being performed via the messaging application 26 may be distributed among a plurality of applications, scripts, add-ins, or the like. Each of the plurality of user devices 14 may interact with the messaging application 26 using an application installed on the user device 14. For example, in some embodiments, a user device 14 may execute a browser application to access the messaging application 26. In other embodiments, the user device 14 may executed a dedicated application (a client application) to access the messaging application 26.

As illustrated in FIG. 2, the memory 22 also stores a message footprint store 28 (such as a message footprint database, table, or other data structure). The message footprint store 28 stores information about each message sent using the messaging application 26, such as a message author, a message origin, a timestamp associated with the message, message contents, each users or groups of users the message is sent to, each administrator of each group the message is sent to, each message attachment, and the like. The message footprint store 28 may be organized in various structures or configurations and, in some embodiments, includes a table with a row or entry for each message sent via the messaging application 26.

Figure 3:
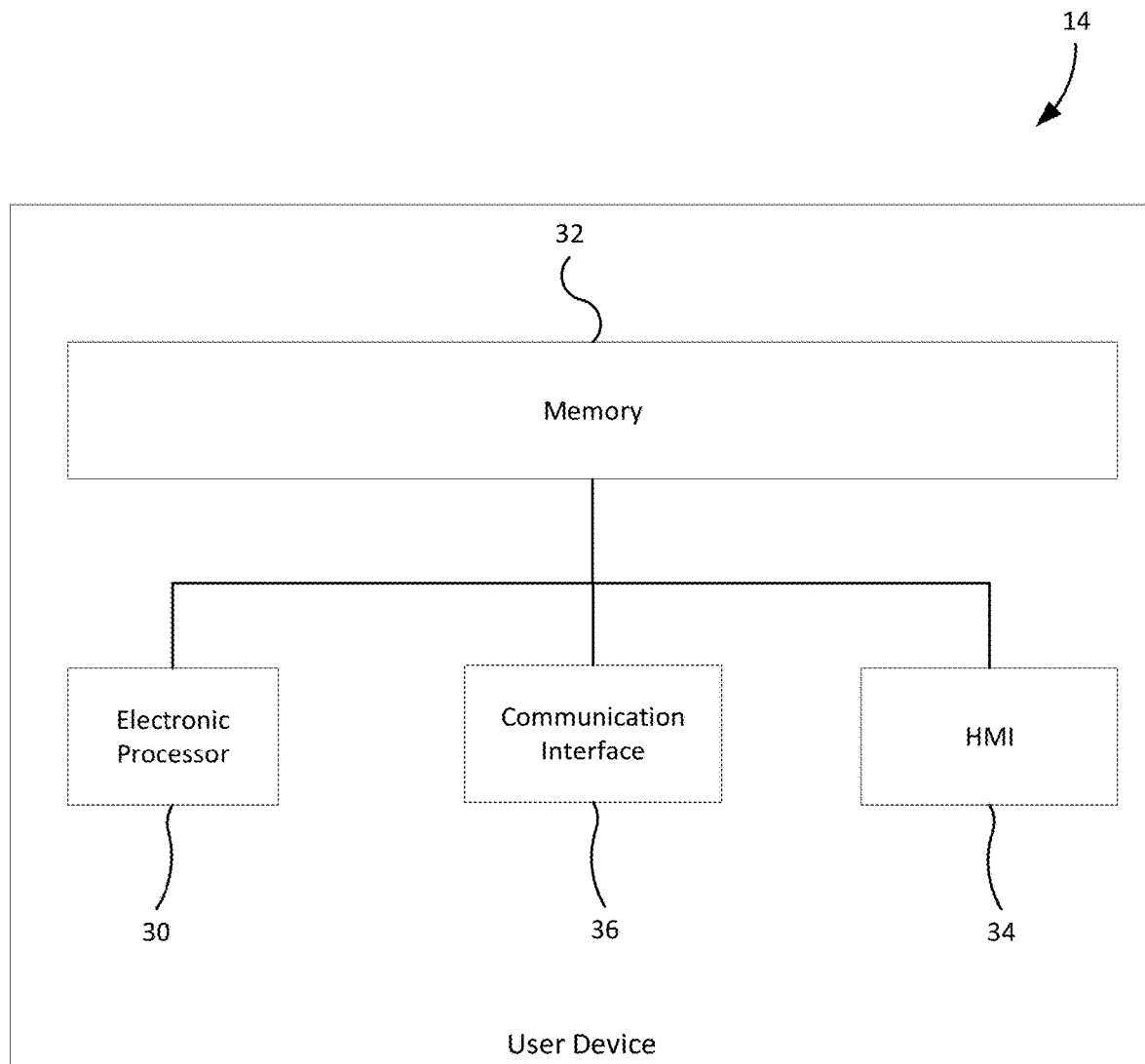
FIG. 3 illustrates a user device included in the system of FIG. 1 according to one embodiment.

Each user device 14 is a personal computing device, such as a desktop computer, a laptop computer, a terminal, a smart television, an electronic whiteboard, a tablet computer, a smart telephone, a wearable device, or the like. As illustrated in FIG. 3, in some embodiments, a user device 14 includes an electronic processor 30, a memory 32, a human-machine interface (HMI) 34, and a communication interface 36. The electronic processor 30, the memory 32, the HMI 34, and the communication interface 36 communicate over one or more communication lines or buses, wirelessly, or a combination thereof. In some embodiments, the user device 14 includes additional components than those illustrated in FIG. 3 and the components included in the user device 14 may arranged in various configurations.

The communication interface 36, which may include a wireless transceiver, allows the user device 14 to communicate with external devices, such as the server 12 over the communication network 16. The memory 32 includes a non-transitory, computer-readable storage medium. The electronic processor 30 includes a microprocessor, application-specific integrated circuit (ASIC), or another suitable electronic device. The electronic processor 20 is configured to retrieve data from the memory 32 and execute, among other things, software instructions to perform various functionality. For example, as noted above, the electronic processor 30 may execute an application (stored in the memory 32) to compose, send, and receive electronic messages managed via the messaging application 26. It should be understood that the user device 14 may also perform additional functionality than the functionality described in the present application.

The HMI 34 includes an input device, an output device, or a combination thereof. For example, the HMI 34 may include a display device, a touchscreen, a keyboard, a keypad, a button, a cursor-control device, a printer, a speaker, a virtual reality headset, a microphone, and the like. In some embodiments, the user device 14 includes multiple HMIs. For example, the user device 14 may include a touchscreen and a keypad. In some embodiments, a HMI 34 is included in the same housing as the user device 14. However, in other embodiments, a HMI 34 may be external to the user device 14 but may communicate with the user device 14 over a wired or wireless connection. For example, in some embodiments, the user device 14 includes a display device connected to the user device 14 via a cable.

As described above, through message forwarding, an original message can quickly reach many users beyond the original group of users (one or more users) the original message was originally sent to. It should be understood that as used in the present application, forwarding a message includes resending a received message from a user to another user or group of users without changing the content of the message or resending a received message from a user to another user or group or users with modification, such as with additional content.

Figure 4:
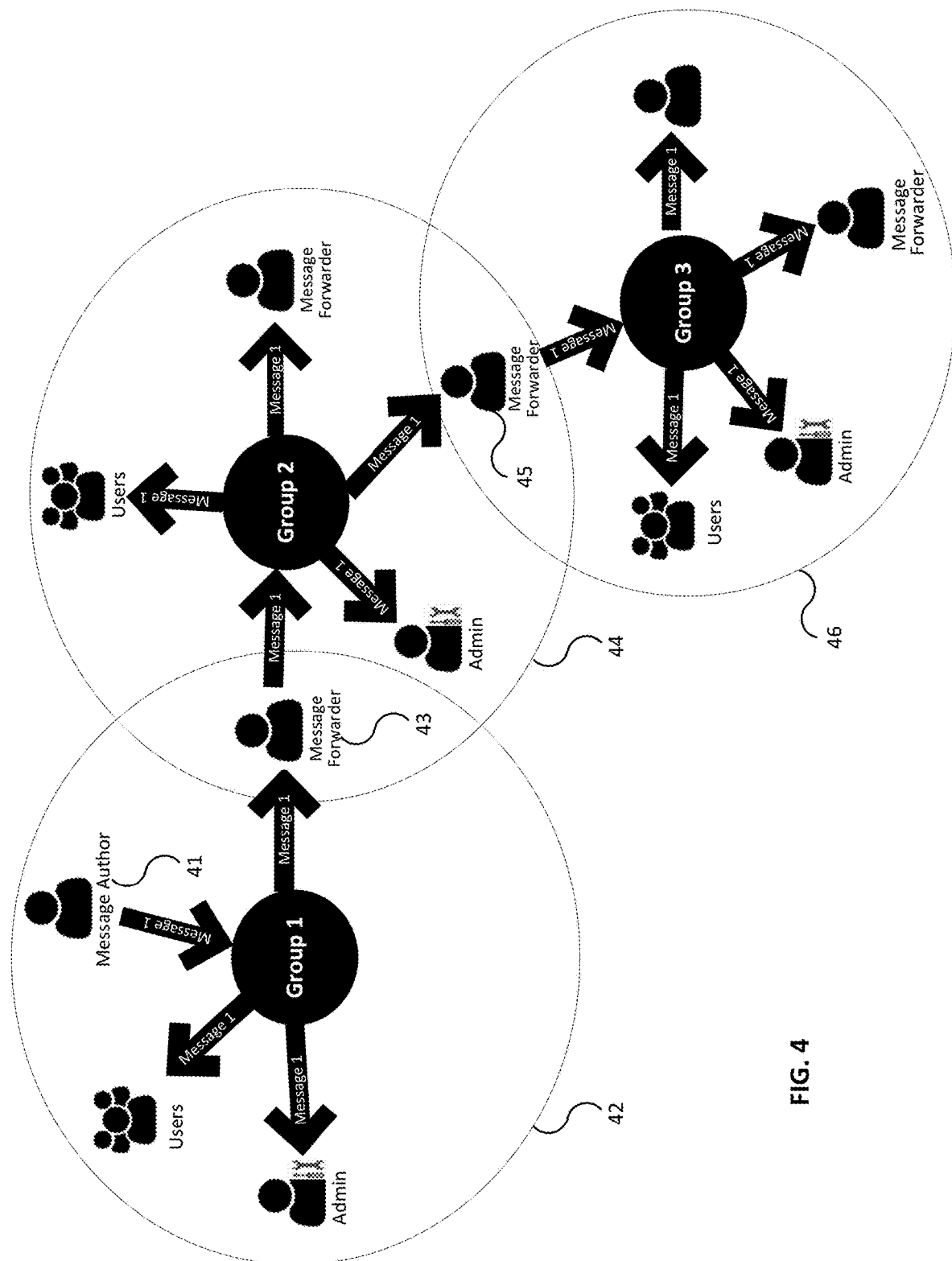
FIG. 4 illustrates one example of forwarding of an electronic message.

For example, FIG. 4 illustrates a message flow 40 of a message (Message 1) within the system 10 (via the messaging application 26). As illustrated in FIG. 4, the message originates from a message author 41, who sends the message to a first group 42 of users. The first group 42 may be, for example, a mailing list, a work unit or work group, a software development team, a business team, or some other grouping of one or more users different from the message author. As illustrated in FIG. 4, in some embodiments, the first group 42 also includes an administrator (Admin), who moderates the first group 42 and may be responsible for managing content, such as messages, sent to the first group 42. The administrator may also manage membership of the first group 42 as well as other duties. In some embodiments, the role of the administrator may be occupied by more than one user in the first group 42. For example, two or more users in the first group 42 may be able to perform the duties of the administrator and may also have all or a subset of the privileges and responsibilities of the administrator as described herein, such as managing membership and moderating content in the first group 42. Accordingly, it should be understood that each time functionality is described herein as being performed by an administrator, this functionality may be performed by one or more users, such as multiple users representing the "administrator" of the group.

Each user included in the first group 42 may take various actions in response to receiving the message from the message author 41. This can include replying to the message (to the message author or the entire first group 42) or forwarding the message. It should also be understood that the messaging functionality provided via the messaging application can include more than just messaging. In addition, forwarding a message as used in the present application also includes "sharing" a message or other content, which some messaging applications allow as another form of forwarding content. For example, the messaging application 26 may allow users to "like" or otherwise promote or endorse messages, poll other users (for example, within a group), send event invitations, initiate audio or video calls, or the like. As described in more detail below, users in the first group 42 can also report messages that should be revoked, such as message including fake, spam, malicious, or inappropriate content using a reporting feature provided via the messaging application 26.

As illustrated in FIG. 4, one of the users in the first group 42 (a message forwarder 43) forwards the message (Message 1) to a different group of users (a second group 44). Much like the first group 42, each user in the second group 44 receives the forwarded message (Message 1) when the message forwarder 43 forwards the message (Message 1) to the second group 44.

The second group 44 may be similar to the first group 42. For example, the second group 44 may include an administrator (or a plurality of administrators as noted above) that performs similar duties to the administrator of the first group 42. In some embodiments, the second group 44 includes at least some of the same members as the first group 42 and may also be related to the first group 42. For example, the first group 42 may be a software development team and the second group 44 may be a testing team assigned to test any software code written by the first group 42. However, in other embodiments, the two groups 42 and 44 may include completely different (and potentially unrelated) groups of users (with the exception of the message forwarder 43).

Much like the message forwarder 43, the second group 44 also may have a user (a second forwarder 45) that forwards the message (Message 1) on to a third group 46. In some embodiments, the message forwarder 43 may be the same user as the second forwarder 45. In other embodiments, as illustrated in FIG. 4, other users who are members of the second group 44 may be the second forwarder 45. Again, much like the second group 44, the third group 46 may include at least some of the same members to the first group 42 and/or the second group 44. The third group 46 may also include an administrator (or a plurality of administrators as noted above) that performs similar duties to the administrator of the first group 42.

Accordingly, as illustrated in FIG. 4, a message can quickly (and without the knowledge of the author) reach many more users than the author originally intended. Furthermore, in most existing messaging systems, it is hard if not impossible to trace the path of a message as the message is forwarded. In particular, each time a message is forwarded, message data (message header data including routing data) is changed, wherein the routing information is replaced with additional information. Thus, the forwarded message takes a new form where only the content may be retained from the original message. Accordingly, the forwarded message loses its connection to the original message, making it difficult if not impossible to trace a forwarded message back to the message origin.

Accordingly, to solve these and other problems, the system 10 is configured to store data regarding messages sent via the messaging application 26 to allow forwarded messages to be traced back to an original message. As described in more detail below, this tracing not only allows messages within a message chain to be revoked but also allows the original author of the message to be identified, which can be used to provide control over message revoking.

Figure 5:
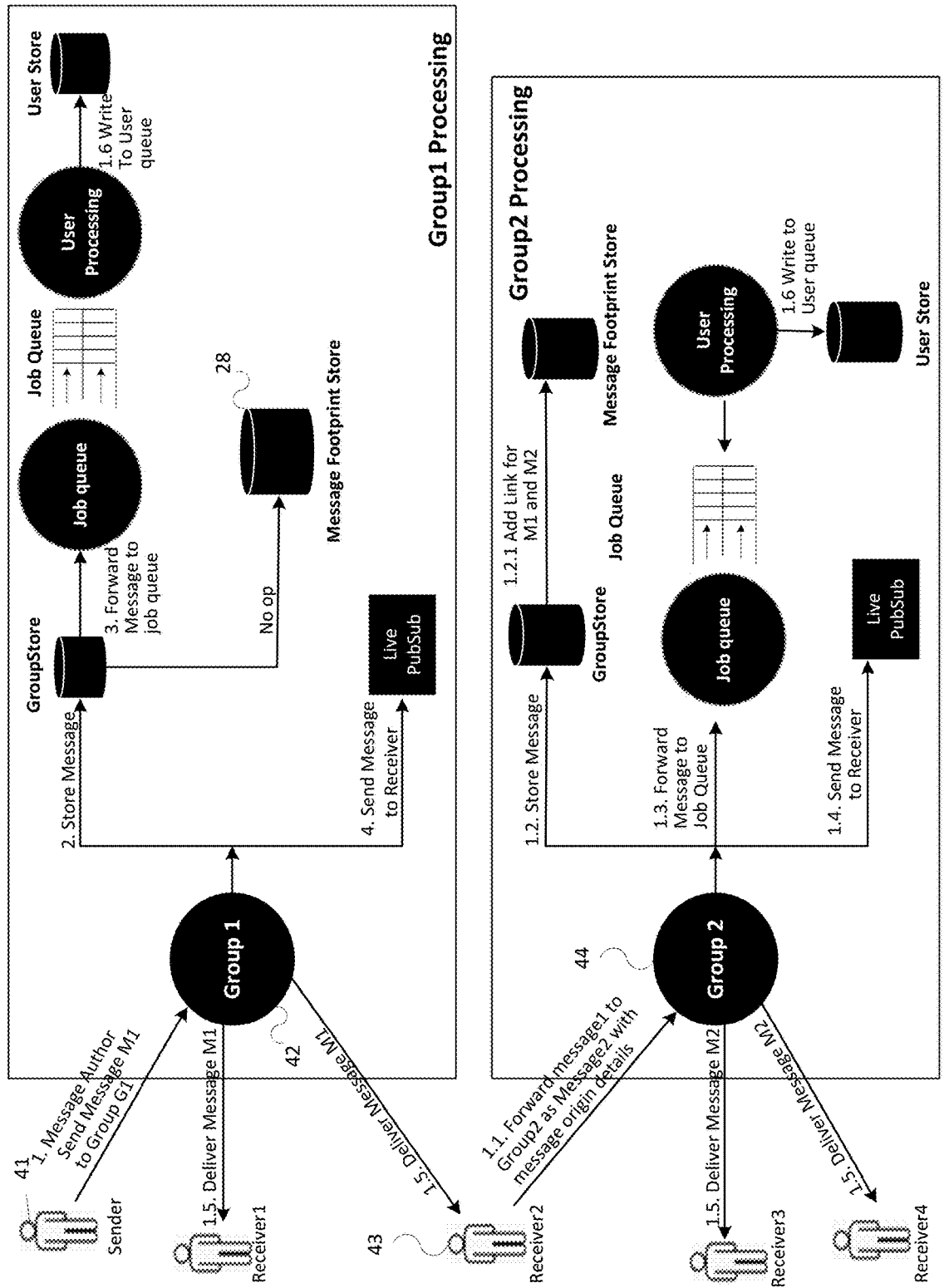
FIG. 5 illustrates processing and forwarding of electronic messages between two groups of users within the system of FIG. 1 according to one embodiment.

FIG. 5 provides additional details regarding how an electronic message is forwarded between groups, such as the groups illustrated in FIG. 4. In particular, as illustrated in FIG. 5, when the message author 41 sends the message (for example, message M1) to the first group 42, the message processed by storing and delivering the message to the specified recipients, such as users in the group (for example, receiver 1 and receiver 2). In particular, as illustrated in FIG. 4, a message is processed as part of group processing wherein the message is stored and forwarded to a job queue (for example, associated with the first group 42), wherein individual user process is performed to write the message to individual user queues or stores. As illustrated in FIG. 5, delivering a message may include broadcasting or publishing the message (as part of a subscription) or making the message available in the user when the user accesses the messaging application 26. As illustrated in FIG. 5, the sent message is also stored. It should be understood that different methods of processing messages (storing, delivering, and the like) may be used and the processing illustrated in FIG. 5 is provided as one example.

As illustrated in FIG. 5, a record for each message sent via the messaging application 26 also stored in the message footprint store 28 (for example, perform asynchronously with the group and user processing of the message). The record for each message includes a unique identifying information for the sent message, unique identifying information for a message the new message was forwarded from (the "previous message," if applicable), and (optionally) unique identifying information for an origin of the new message (the "origin message" or "original message," if applicable).

For example, each message handled by the messaging application 26 may be assigned a unique identifier. Thus, when a new message is sent via the messaging application 26, the server 12 (through execution of the messaging application 26) may store this unique identifier in the message footprint store 28. The server 12 may also store a unique identifier of a group the new message was sent to. In some embodiments, the combination of the unique identifier of the new message and the unique identifier of the group the new message was sent to form is stored in the message footprint store 28 as a combined a single unique identifier for the new message. As described in more detail below, storing information on the group a message was sent to can be used to identify users authorized to revoke a message (or at least request revoking of a message), such as by identifying an administrator (or a plurality of administrators as noted above) associated with a group.

When a new message sent via the messaging application 26 is a forward of a previously sent message, the record in the message footprint store 28 for the new message also includes the unique identifier of the forwarded message. The record may also store a unique identifier of the group the forwarded message was sent to. As noted above, in some embodiments, the unique identifier for the forwarded message can be combined with the unique identifier of the group the forwarded message was sent to (as a combined unique identifier for the forwarded message).

While the identifying information regarding the forwarded message stored in the message footprint store 28 identifies the immediately preceding message in a message chain of forwards, the message footprint store 28 may also store unique identifying information for an origin of the message. Similar to the identifying information for the forwarded message, the identifying information for the origin message may include a unique identifier of the origin message, a unique identifier of the group the origin message was sent to, or a combination thereof.

Accordingly, as illustrated in FIG. 5, when the message M1 is forwarded (as message M2), the message includes content (for example, the content of message M1) and destination information (for example, in a message header). The message also includes message origin details, such as previous header information, original header information, or a combination thereof. The server 12 uses the message origin details to update the message footprint store 28 (as part of group processing) and the message is processed as described above. The server 12, however, may remove the message origin details from the forwarded message (message M2) before delivering the message to the designated recipients. Thus, in this embodiment, when a user forwards a message, the creation of the forwarded message includes additional details regarding the origin of the forwarded message (e.g., the previous message), which the server 12 uses to add a link to the message footprint store 28 but may remove before delivering the message to the designated recipients.

Thus, using the messages M1 and M2 illustrated in FIG. 5, when both of these messages have been sent, the message footprint store 28 includes (a) a record for M1 including unique identifying information for M1 (M1 unique identifier and Group 1 unique identifier) and no identifying information for a forwarded or origin message (since M1 is the origin message) and (b) a record for M2 including unique identifying information for M2 (M2 unique identifier and Group 2 unique identifier), unique identifying information M1 as the forwarded message, and unique identifying information for M1 as the origin message. It should be understood that, in some embodiments, the record stored in the message footprint store 28 for each message may only include identifying information of the sent message and the forwarded message. In this embodiment, the information regarding a forwarded message may be used to trace back to an origin message through other records stored in the store 28. However, including the identifying information regarding the origin message in each record may improve processing speeds and efficiencies by being able to directly identify the origin message for a message from a single record in the store 28. When adding a new record to the store 28, the new record may be created by accessing existing records in a store. For example, the unique identifying information for the forwarded message may be used to determine unique identifying information for the origin message. For example, if the message M2 is forwarded (as message M3), the record in the store 28 for the message M3 may including identifying information for the message M3 and identifying information for the message M2. To provide the identifying information for the origin of the message (message M1), the record for M2 may be accessed from the store 28 and used to complete the record for message M3 (for example, by duplicating the identifying information for the origin message from the record for M2 to the new record for M3).

Each record for a message in the store 28 may also include additional information, such as a copy of the message itself, message attachments (for examples, copies of such attachments or links or identifiers), a timestamp associated with the message (when the message was sent), an identifier of the administrator of the first group 42, or the like. In some embodiments, a record may also store various statistics regarding a message, such as a counter tracking the number of times a message is forwarded, a counter tracking a number of recipients of a message (by group of individual users), a counter tracking a number of reports or requests to revoke a message (described in more detail below), counters for "likes" or comments for a message, and the like. For example, each time a record is added to the store 28, one or more counters associated with the origin message may updated within the store, such as counters tracking a number of forwards, a number of recipients, or the like. Also, in some embodiments, each record can store identifying information of each forward of the message. As described in more detail below, storing this information for a message allows a message to be traced back to an origin (e.g., for revoking purposes) and also allows users to track the reach (number of users or groups of users who have received a message) of a message, which may be used to determine the "virality" of the message. For example, when a number of forwards of a message or a number of recipients of a message satisfies (reaches or exceeds) a predetermined threshold, the message may be classified as a "viral" message.

In some embodiments, data stored in the message footprint store 28 may be purged after a period of time for storage and data processing efficiency reasons. In some embodiments, the type of the message associated with a record in the store 28 may dictate the lifespan of the record. For example, in some embodiments, a record in the store 28 for an instant message may be retained for a shorter period of time than a record in the store 28 for a different type of message, such as an email message (given that an instant message may have a shorter lifespan of usefulness than an email message). In particular, as one example, records in the store 28 for instant messages may be retained for only 24 hours before being purged, wherein records in the store 28 for email messages may be retained for a longer period before being purged, such as, for example, six months. Also, in some embodiments, when a message is revoked as described below, records associated with the revoked message may be deleted from the message footprint store 28 (for example, for memory storage and processing efficiency purposes). In some embodiments, an administrator for the system 10 (the messaging application 26 or an organization the plurality of user devices 14 are associated with) may be able to configure the lifespan of records in the message footprint store 28 to satisfy various goals and resources.

As noted above, messages may be revoked for various reasons, such as to remove fake, spam, or malicious content, to restrict access to potentially sensitive or confidential information, or to remove out-of-date or no longer necessary or important messages. The author of the message may decide to revoke a message and access various user interface or controls provided via the messaging application 26 to initiate the revoking. In response to such a request, the messaging application 26 uses the records stored in the message footprint store 28 to identify all forwards of the message being revoked and delete or otherwise block access to the original message and each forward of the original message. In particular, the messaging application 26 uses the store 28 to identify each record that includes identifying information for the original message and then marks or otherwise sets the message associated with each record as being revoked (for example, deleted, or blocked). In some embodiments, the author may also selectively revoke particular messages in the message chain, such as, for example, just the original message, forwards of the original message to particular groups, forwards of the original message exceeding a particular number of forwards or number of recipients or the like. It should be understood that revoking a message described herein as being performed by the author of the original message can also be performed, in some embodiments, by an administrator associated with the author (such as an administrator associated with the original group of users receiving the original message). Thus, as used in the present application, actions performed herein in response to input or actions taken by the author of a message include input or actions taken by the author or an administrator associated with the author.

As described herein, when a message is revoked, the message and any content associated with the message is not visible to recipients the message was originally sent to. For example, if the revoked message is an email, the message may be deleted from the inbox and other mailboxes for each recipient. When the message is an instant message, the revoked message may be deleted from a chat history or conversation for the group where the message was received. In other embodiments, a revoked message may not be visible to a user but information may be provided to the user informing the user that a message was revoked (for example, without providing information regarding the content of revoked message or other details).

Besides the author, other users may be able to report or request that a message be revoked. For example, as noted above, when a message includes spam, malicious content, or inappropriate content, users in any of the groups receiving the message (including an administrator) may have the ability to report the message for review and potential revoking. Similarly, some groups may implement automated review of messages (for example, via a bot or other automated processing mechanisms) and such automated review processes may similarly report messages for review and potential revoking.

Figure 6:
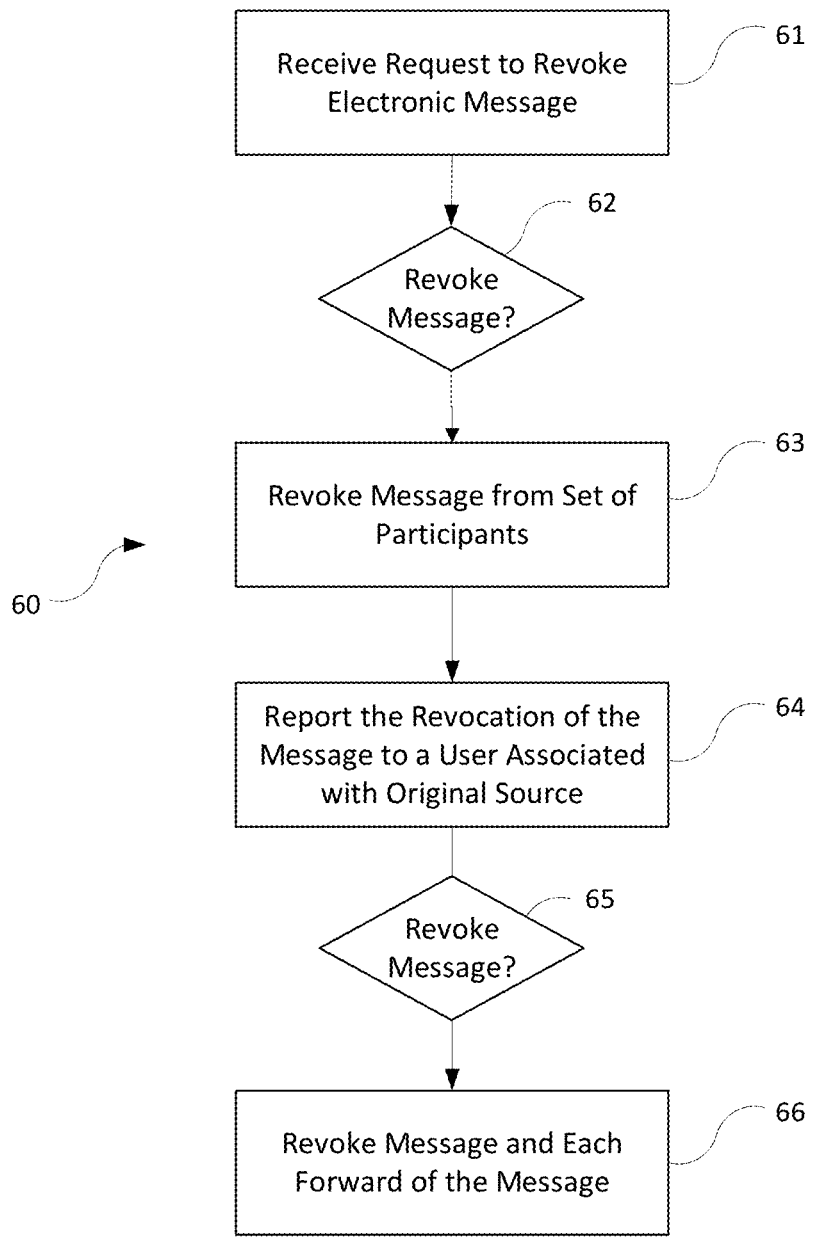
FIG. 6 is a flow chart illustrating a method for reporting and revoking a message performed by the system of FIG. 1 according to one embodiment.

For example, FIG. 6 is a flow chart illustrating a method 60 for reporting and revoking a message using the system 10 according to one embodiment. The method 60 is described herein as being performed by the server 12 (through execution of the messaging application 26 via the electronic processor 20). However, as noted above, in some embodiments, this functionality may be distributed in various ways, including portions of the functionality being performed locally on a user device 14.

As illustrated in FIG. 6, the method 60 includes receiving a request to revoke an electronic message sent to a set of recipients (one or more recipients) (at block 61). For example, using the example forwarding of messages illustrated in FIG. 4, a user in the third group 46 may report a received forwarded message for containing a link to a malicious website, containing spam, being a fake message, or the like. In some embodiments, the request can be received in response to a user selecting (clicking) a "report" or "revoke" selection mechanism displayed as part of a user interface displaying the message being reported. However, it should be understood that a user may report a message in other ways. Also, in some embodiments, as noted above, automated processes may be used to initially identify and report messages for potential revoking in addition to or as an alternative to user-initiated report. As noted above, in some embodiments, when a message is reported for review, a counter can be incremented in the message footprint store 28 for the message. In some embodiments, additional information may also be stored regarding the reporting of message, such as the source of the report, a timestamp associated with the report, or the like. As described in more detail below, this recorded information may be used to calculate various statistics regarding messages, users, or the like.

Figure 7:
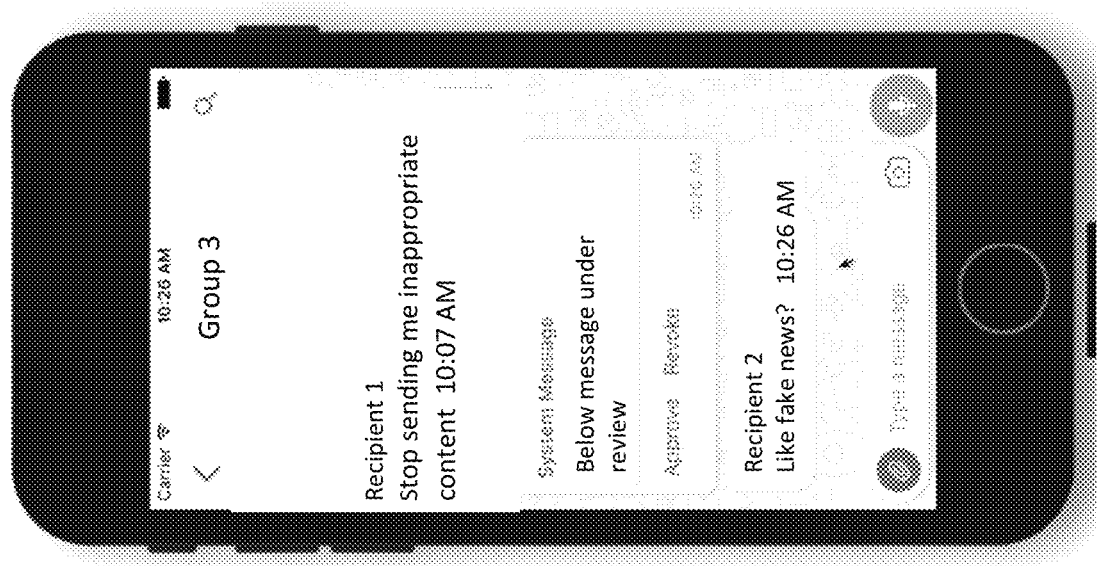
FIG. 7 illustrates a user interface for revoking a message provided by the system of FIG. 1 according to one embodiment.

As illustrated in FIG. 6, when a message is reported for potential revoking, a decision is made regarding whether to revoke the reported message (at block 62). In some embodiments, this decision is made based on input received from an administrator (or a plurality of administrators as noted above), such as the administrator associated with the group where the message was reported. For example, continuing with the example from FIG. 4, when a user in the third group 46 reports the message, the administrator of the third group 46 may review the reported message and decide whether the forwarded message should be approved or revoked. In some embodiments, as illustrated in FIG. 7, a user interface is provided to an administrator that displays the reported message as well as one or more selection mechanisms for revoking the message or, alternatively, approving the message (which retains the message and allows recipients of the message to view and continue to interact with the message). The reported message may be displayed within the context of a particular conversation or chat history to provide context for the administrator. Additional information may also be provided through the user interface, such as, for example, information regarding the user who reported the message, information regarding the user who sent the reported message, previously reported or revoked messages for the group, or the like. In some embodiments, in addition to or as an alternative to administrator deciding whether to revoke a message, an automated process (a bot) may be used to make this decision. Accordingly, when a message is reported, an administrator, an automated process, or both may review the reported message and determine whether to revoke the message. When both an administrator and an automated process is used, the automated process may provide a recommended action, which an administrator may approve or confirm before any actions are taken.

In some embodiments, when the reported message is revoked (based on input received from an administrator, an automated process, or both), the server 12 may automatically revoke all forwards of the message (including the original message). As described above, the server 12 may use the records in the message footprint store 28 to trace the reported message back through the origin and revoke all forwards of the message as well as the original message.

As an alternative to revoking all forwards of a message in response to the message being reported and revoked at one level of the message chain, in some embodiments, the server 12 only revokes the message at the level where the revoking was reported (at block 63). Accordingly, if a user is a member of more groups than just the group in which the message is reported and revoked, and at least one other group that the user is a member of has received the message, the user may still access the message as it has not yet been revoked for other groups that the user is a member of.

In this situation, an administrator associated with one group can revoke messages at the associated group but does not have direct power to revoke other forwards of the message. Accordingly, in this situation, as illustrated in FIG. 6, when a message is revoked at one group (different from the group where the message originated from) (at block 63), a review request is sent to a user associated with the author and/or administrator of the group where the message originated (for example, the first group 42 continuing with the example in FIG. 4) (at block 64). Again, the server 12 uses the records stored in the message footprint store 28 to identify the original message as well as, in some embodiments, the group where the original message originated and then reports the revoking of the message to a user associated with the originating message or source, such as the author or an administrator associated with the author (the administrator associated with the group the message was originally sent to) (at block 64). Similar to administrator receiving the initial report or request for revoking, the user associated with the original message can review the message and decide whether to revoke or approve the message. As noted above, in some embodiments, an automated process may be used in place of or in addition to the user associated with the original message.

In embodiments where the group includes a plurality of administrators, each of the administrators may have the ability to revoke the message. In some embodiments, if there is more than one administrator, a vote by all administrators may be required to revoke the message. The amount of votes necessary to revoke the message may vary based upon group rules or policies. For example, a simple majority may be needed, a two-thirds majority may be needed, a one-third majority may be needed, or a unanimous agreement may be needed to revoke the message.

When a decision is made to revoke the message at its origin (at block 65), the original message is revoked as well as each forward of the message (at block 66). As described above, the server 12 uses the record stored in the message footprint store 28 to identify all forwards of the original message and revoke each identified forwarded message.

Figure 8:
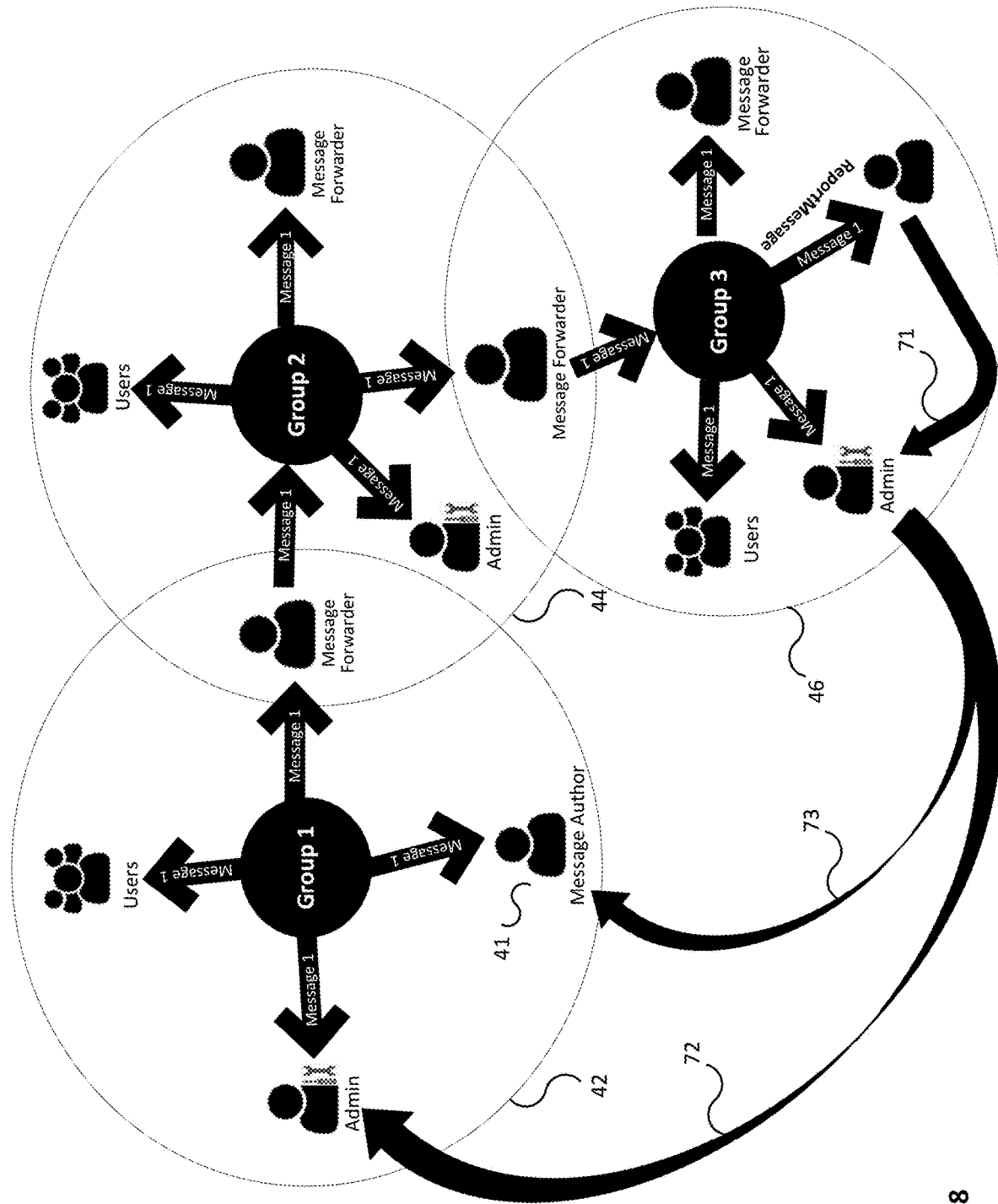
FIG. 8 illustrates one example of revoking a forwarded message.

For example, FIG. 8 illustrates revoking a message with the message chain illustrated in FIG. 4 using the method 60. As illustrated in FIG. 8, in response to the administrator of the third group 46 receiving a request to revoke the message from a user in the third group 46 (first arrow 71 representing block 61 of FIG. 6) and the administrator revoking the message (representing block 62 of FIG. 6), the message is blocked from the users included in the third group 46 (representing block 63 of FIG. 6). In addition, a review request is sent to a user associated with the original message (second and third arrows 72 and 72 representing block 64 of FIG. 6). For example, as illustrated in FIG. 8, in some embodiments, a review request is sent to one or both of the administrator of the first group 42 (second arrow 72) and the message author 41 (third arrow 73). As described above, the group where the message originated and, optionally, the message author 41 are identified by accessing the message footprint store 28 and, in particular, the record associated with the revoked message sent to the third group 46. The administrator of the first group 42 and/or the message author 41 are informed in the review request of the revoked message at the third group 46 and can decide whether to revoke the message from the entire message chain. In some embodiments, the review request includes additional information such as, for example, how many times the message has been reported, revoked, or both, how many times the message has been forwarded, a number of recipients of the message, how many recipients were affected by the revoking at the third group 46, or the like. For example, in some embodiments, a single review request may be generated and sent even when multiple reports have been generated for the message. In this situation, however, the review request may include an updated count of the number of reports, revokings, recipients, or the like are associated with the message. Again, this information or a portion thereof may be determined based on the records stored in the message footprint store 28 and the most updated version of this information can be obtained in response to a user accessing the review request to ensure that the user has access to the most update to date information regarding the message. In some embodiments, a flag may be set for a message when a review request has been generated to ensure that only a single review request is sent for that message regardless of whether the message has been reported multiple times.

Other information may be obtained from the report itself, such as a reason for the report. For example, in some embodiments, the review request may contain a number of reports and a description of why the message was reported by one or more users (e.g., "the message contains a link to a malicious website").

It should be understood that, in some embodiments, the review request is only sent when a message is revoked at a level within the message chain. However, in other embodiments, a review request may be sent any time a message is reported. For example, even if an administrator at one level in the message chain decides not to revoke the message, the author (or associated administrator) may use the existence of such reports to influence whether the message should be revoked for all levels (overriding the decision of the administrator where the message was reported).

When a review request is sent to both the author 41 and an associated administrator and either the author 41 or the administrator selects to revoke a message, the message may be revoked at all levels. However, in other embodiments, both users may need to select to revoke a message before the message is revoked at all levels of the message chain. However, it should be understood that different rules may be applied in this situation. For example, in some embodiments, when the author 41 selects to revoke a message but the administrator does not, the message may be revoked from the group where the message originated but not from any lower levels. In addition, in some embodiments, when a decision is made at the originating level of a message not to revoke a message and the message was already revoked at a lower level based on a report, the revoked message at the lower level may remain revoked or may be re-instated (overriding the original revoking).

Figure 9:
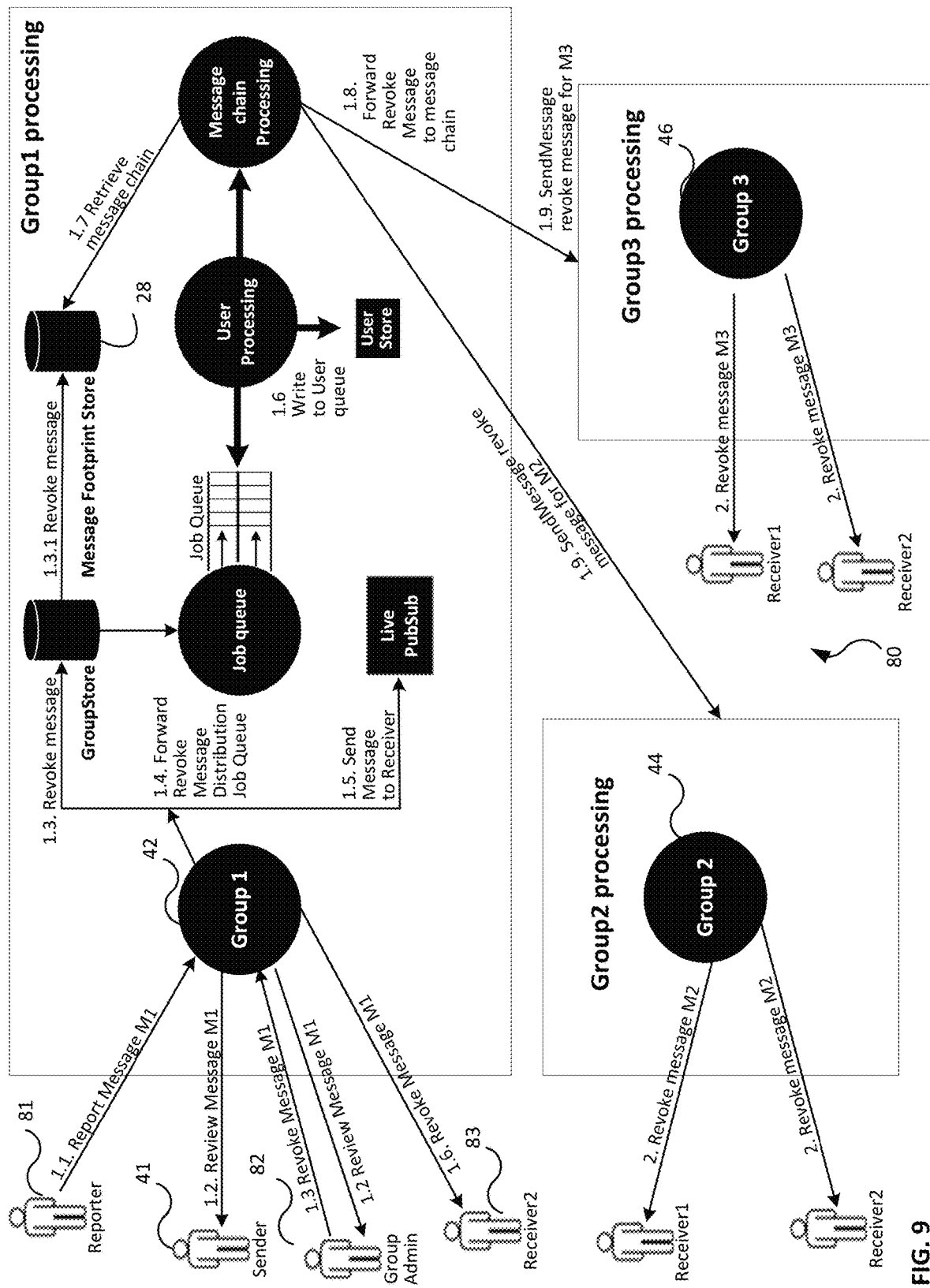
FIG. 9 illustrates revoking an electronic message performed by the system of FIG. 1 according to one embodiment.

FIG. 9 illustrates further details of how a message is revoked (for example, message M1 illustrated in FIG. 5) using the method of FIG. 6 according to one embodiment. For example, as illustrated in FIG. 9, when a message is reported (see reporter 81), a review request is sent to both the author 41 of the message M1 and the administrator 82 for the group where the message originated from (the first group 42). When either of these users select the reported message for revoking (e.g., the administrator 82 as illustrated in FIG. 9), a revoke message is generated and processed as illustrated in FIG. 9. In particular, message chain processing interacts with the message footprint store 28 to determine the message chain and deliver revoke messages for forwarded versions of the message M1 (message M2) (through group processing and user processing) to users in groups receiving the forwarded versions (each receiver in the second group 44 and the third group 46). Receipt of the revoke message by each user implements the revoking of the message in the inbox, chat history, or other message listing for the user.

Using the workflow illustrated in FIGS. 6, 8, and 9 allows a user to report a message for potential revoking but restricts the user from automatically revoking messages at the user's level in the message chain as well as other levels, which prevents misuse of the system by an individual user. In particular, by reviewing the reports by an administrator, oversight is provided before a message is revoked. Furthermore, an administrator at one level of the message chain is restricted from automatically revoking the message from all other levels as this functionality is limited to the originating level, retaining control with the original author of the message (or associated administrator) and holding authors and associated administrators responsible for content message.

As noted above, in some embodiments, portions of the workflow described above can be performed in an automated fashion. For example, reporting and reviewing message for revoking may be performed in an automated fashion (for example, using bots configured to analyze content included in messages). Also, in some embodiments, other automated actions may be taken based on various rules, which may be configurable by an administrator of the system 10, a particular group of users, or a combination thereof. For example, messages may be automatically revoked even without administrator confirmation when a number of reports for a message satisfies (reaches or exceeds) a threshold. As noted above, the message footprint store 28 may track counts of how many reports have been received for a particular message. Furthermore, when no input has been received from an administrator regarding a reported message for a predetermined period of time, the message may be automatically revoked. For example, when a user reports a message at one group level and no decision is made regarding whether to revoke the message at that group level for a predetermined period of time, the message may be automatically revoked at that group level. Similarly, when a message is reported to a user associated with the original message and no decision is made regarding whether to revoke the message at all levels of the message chain for a predetermined period of time, the message may be automatically revoked. It should be understood that the time period used for either of these automatic actions may be set differently for whether the revoking is being performed at one level or multiple levels, whether a certain number of reports have been received for the message or the like.

As noted above, the functionality provided through the records stored in the store 28 not only allows a message to be traced back to an origin for purposes of revoking a message but also messages to be tracked and effective messages to be incentivized. For example, users often taken pride in getting an authored message forward, liked, commented, or the like and a message can play an important role in social and political awareness, information dissipation, calls to action, and the like. Current messaging systems, however, fail to track these actions for a message. Accordingly, users have no way to know how his or her message is received or, in particular, whether a message has become viral. As noted above, when a number of forwards of a message or a number of recipients of a message satisfies (reaches or exceeds) a predetermined threshold, the message may be classified as a "viral" message. Thus, without insight in the reach of a message, there is little or no incentive for a user to draft messages with a particular reach or virality.

Accordingly, to solve these and other problems, the data maintained in the message footprint store 28 can be used to provide various statistics about a message, which can be used to reward users, incentivize particular types of messages, or the like. For example, in some embodiments, the messaging application 26 can provide one or more user interfaces that provide statistics about a message, such as, for example, a number of times a message has been forwarded (resent, shared, copied, or the like) to other users or groups of users and a number of potential recipients of the message. In some embodiments, the statistics also include a number of likes the message received and/or a message sentiment, which may be based on the content of the message, recipient reaction to the message, reports requesting revoking, actual revokings, or a combination thereof. The statistics may also include an aggregate number of requests to revoke the message having a particular reason (for example, the same reason or similar reasons) for requesting the revocation of the message, such as whether the message includes confidential information, includes malicious content, includes false content, or the like. For example, the statistics may include a number of requests to revoke where users identified the message as including a link to a malicious website. The reasons to revoke may be identified in a separate field and selected from a predetermined list of reasons to revoke the message or may be identified by parsing the content of a request to revoke the electronic message. These statistics can be provided as global statistics, statistics limited to particular regions or groups (defined lists of groups or types of groups), or a combination thereof.

Thus, by building the message footprint store 28 as described above, the journey of a message is traced from its origin through each forward. In particular, as noted above, various counters can be maintained in the message footprint store 28 and updated as actions are taken with respect to an electronic message. Thus, these counters can be accessed and used to provide various statistics. Alternatively or in addition, the links between messages established via the records in the store 28 can be used to trace a chain or path of a message and various counts or other calculations can be performed based on the records included in the identified chain or path. For example, a number of records included in the chain or path can be counted to calculate a number of forwards. Similarly, a number of users associated with group identified in a chain or path can be summed to calculate a number of recipients.

It should be understood that the user interfaces provided by the messaging application 26 to access statistics for a message (or a group of messages) may also include selection mechanisms for revoking a message or reporting a message for potential revoking as described above. Accordingly, the user interfaces can serve as a central location for managing sent messages. The statistics may also be incorporated into other user interfaces provided by the messaging application 26, such as within a message window or display (for example, an inbox of an email account). The statistics may be provided in numerical form, textual form, or graphic form. For example, messages with particular reach levels may be marked or displayed differently from other messages to distinguish the electronic message from other messages associated with different values of the statistic. Also, various icons can be displayed with a message that indicate various statistics for the message. For example, different icons may be used to identify messages having reaches within certain parameters, messages reported for possible revoking, messages revoked, or the like. Also, in some embodiments, various notifications or alerts can be automatically generated and transmitted in response to a message achieving a particular statistic. For example, an alert may be generated (to an author of the message, an administrator, or other user) when a message is forwarded a predetermined number of times, is sent to a predetermined number of recipients, or the like. These statistics may also be used to generate a score for a user or a group of users, which may be used to automatically control the user's or the group's access to particular systems, functionality, or the like.

Thus, embodiments described herein provide methods and systems for revoking an electronic message. Various features and advantages of some embodiments are set forth in the following claims.

What is claimed is:

1. A device-implemented method of revoking an electronic message, the method comprising:
   storing, in a data store, a record, the record comprising data identifying a first message sent via an electronic messaging application and data identifying a second message, the first message being a forwarded message of the second message;
   receiving, from a first user device associated with a first user, a request to revoke the first message, the first user being a recipient of the first message; and
   in response to receiving the request to revoke the first message:
      identifying, based on the record stored in the data store, the second message;
      providing, to a second user device associated with a second user, a user interface reporting the request to revoke the first message, the user interface including:
         the request to revoke the first message;
         a selection mechanism to confirm revoking of the first message;
         statistical information about the first message including a counter value including a number of revocation requests received for the first message;
         the first message and context of the first message within a conversation thread associated with first message; and
      in response to receiving, from the second user device, a selection of the selection mechanism:
         revoking the first message and the second message.

2. The method of claim 1, wherein storing the record comprising the data identifying the second message includes storing the record comprising unique identifying information for the second message.

3. The method of claim 1, wherein storing the record comprising the data identifying the second message includes storing the record comprising unique identifying information for a third message, the first message being a forwarded message of the third message and the third message being a forwarded message of the second message.

4. The method of claim 1, wherein providing the user interface to the second user device includes providing the user interface to a user device associated with at least one selected from a group consisting of an author of the second message and an administrator associated with a group of users receiving the second message.

5. The method of claim 1, further comprising, in response to receiving a request to revoke a third message, incrementing a counter tracking a number of requests associated with the third message, and, in response to the counter satisfying a predetermined threshold, automatically revoking the third message and each forwarded message of the third message.

6. A system for revoking an electronic message, the system comprising an electronic processor configured to store, in a data store, a record, the record comprising data identifying a first message sent via an electronic messaging application and data identifying a second message, the first message being a forwarded message of the second message;
   receive, from a first user device associated with a first user, a request to revoke the first message, the first user being a recipient of the first message; and
   in response to receiving the request to revoke the first message:
      identify, based on the record, the second message,
      provide, to a second user device associated with a second user, a user interface reporting the request to revoke the first message, the user interface including:
         the request to revoke the first message;
         a selection mechanism to confirm revoking of the first message;
         statistical information about the first message including a counter value including a number of revocation requests received for the first message;
         the first message and context of the first message within a conversation thread associated with first message; and
      in response to receiving, from the second user device, a selection of the selection mechanism:
         revoke the first message and the second message.

7. The system of claim 6, wherein the data identifying the second message includes unique identifying information for the second message.

8. The system of claim 6, wherein the data identifying the second message includes data identifying a third message, the first message being a forwarded message of the third message, and the third message being a forwarded message of the second message.

9. The system of claim 6, wherein the first user is included in a group of users receiving the first message.

10. The system of claim 9, the electronic processor further configured to, in response to receiving the request to revoke the first message, notify an administrator associated with the group of users.

11. The system of claim 6, wherein the second user is associated with the second message and includes at least one selected from a group consisting of an author of the second message and an administrator associated with group of users receiving the second message.

12. The system of claim 6, the electronic processor further configured to, in response to receiving a request to revoke a third message, increment a counter tracking a number of requests associated with the third message, and, in response to the counter satisfying a predetermined threshold, automatically revoke the third message and each forwarded message of the third message.

13. A non-transitory, computer-readable medium comprising instructions that, when executed by an electronic processor, perform a set of functions, the set of functions comprising:
   store, in a data store, a record, the record comprising data identifying a first message sent via an electronic messaging application and data identifying a second message, the first message being a forwarded message of the second message;
   receive, from a first user device associated with a first user, a request to revoke the first message, the first user being a recipient of the first message; and in response to receiving the request to revoke the first message:

identify, based on the record, the second message, increment a counter tracking a number of requests, and in response to the counter not satisfying a predetermined threshold:

provide, to a second user device associated with a second user, a user interface reporting the request to revoke the first message, the user interface including a selection mechanism to confirm revoking of the first message and in response to receiving, from the second user device, a selection of the selection mechanism:

revoke the first message and the second message.

14. The non-transitory, computer-readable medium of claim 13, wherein the second user includes at least one selected from a group consisting of an author of the original message and an administrator associated with the group of users receiving the second message.

15. The non-transitory, computer-readable medium of claim 13, wherein the second user includes a group of administrators associated with a group of users receiving the second message.

16. The non-transitory, computer-readable medium of claim 15, wherein the set of functions further comprises conduct a vote of the group of administrators.

17. The non-transitory, computer-readable medium of claim 16, wherein the vote is undertaken using at least one selected from the group consisting of a simple majority vote, a one-third majority vote, a two-thirds majority vote, and a unanimous decision vote.

18. The non-transitory, computer-readable medium of claim 13, wherein the set of functions further comprises:

in response to receiving a request to revoke a third message:

increment a second counter tracking a number of requests associated with the third message, and, in response to the counter satisfying a predetermined threshold, automatically revoke the third message and each forwarded message of the third message.

* * * * *